United States Patent
Samson et al.

(10) Patent No.: US 8,234,226 B2
(45) Date of Patent: *Jul. 31, 2012

(54) DATA CLASSIFICATION METHODS AND APPARATUS FOR USE WITH DATA FUSION

(75) Inventors: Jerome Samson, Belleair, FL (US); Francis Gavin McMillan, Clearwater, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 80 days.

This patent is subject to a terminal disclaimer.

(21) Appl. No.: 12/847,856

(22) Filed: Jul. 30, 2010

(65) Prior Publication Data
US 2010/0299365 A1    Nov. 25, 2010

Related U.S. Application Data

(63) Continuation of application No. 12/389,162, filed on Feb. 19, 2009, now Pat. No. 7,792,771, which is a continuation of application No. 11/692,480, filed on Mar. 28, 2007, now Pat. No. 7,516,111, which is a continuation of application No. PCT/US2004/031965, filed on Sep. 28, 2004.

(51) Int. Cl.
*G06F 15/18* (2006.01)
(52) U.S. Cl. .......................................................... 706/1
(58) Field of Classification Search ........................ 706/1
See application file for complete search history.

(56) References Cited

U.S. PATENT DOCUMENTS

| | | | |
|---|---|---|---|
| 4,646,145 A | 2/1987 | Percy et al. | |
| 5,341,142 A | 8/1994 | Reis et al. | |
| 5,412,731 A | 5/1995 | Desper | |
| 5,497,430 A | 3/1996 | Sadovnik et al. | |
| 5,550,928 A | 8/1996 | Lu et al. | |
| 5,771,307 A | 6/1998 | Lu et al. | |
| 5,850,470 A | 12/1998 | Kung et al. | |
| 5,937,392 A | 8/1999 | Alberts | |
| 5,963,653 A | 10/1999 | McNary et al. | |
| 6,081,269 A | 6/2000 | Quarendon | |
| 6,091,956 A | 7/2000 | Hollenberg | |
| 6,137,911 A | 10/2000 | Zhilyaev | |
| 6,246,796 B1 | 6/2001 | Horikoshi et al. | |
| 6,385,329 B1 | 5/2002 | Sharma et al. | |
| 6,400,996 B1 | 6/2002 | Hoffberg et al. | |

(Continued)

FOREIGN PATENT DOCUMENTS
CA    2110866    6/1994
(Continued)

OTHER PUBLICATIONS

Bernstein et al., "An Introduction to Map Matching for Personal Navigation Assistants," Princeton University, Aug. 1996, 17 pages.

(Continued)

*Primary Examiner* — Michael B Holmes
(74) *Attorney, Agent, or Firm* — Hanley, Flight & Zimmerman, LLC.

(57) ABSTRACT

Methods and apparatus for classifying data for use in data fusion processes are disclosed. An example method of classifying data selectively groups nodes of a classification tree so that each node is assigned to only one of a plurality of groups and so that at least one of the groups includes at least two of the nodes. Data is classified based on the classification tree and the selective grouping of the nodes, and the results displayed.

24 Claims, 7 Drawing Sheets

U.S. PATENT DOCUMENTS

| | | |
|---|---|---|
| 6,434,520 B1 | 8/2002 | Kanevsky et al. |
| 6,574,350 B1 | 6/2003 | Rhoads et al. |
| 6,611,842 B1 | 8/2003 | Brown |
| 6,618,725 B1 | 9/2003 | Fukuda et al. |
| 6,650,779 B2 | 11/2003 | Vachtesvanos et al. |
| 6,662,195 B1 | 12/2003 | Langseth et al. |
| 6,671,715 B1 | 12/2003 | Langseth et al. |
| 6,683,966 B1 | 1/2004 | Tian et al. |
| 6,714,917 B1 | 3/2004 | Eldering et al. |
| 6,728,390 B2 | 4/2004 | Rhoads et al. |
| 6,744,906 B2 | 6/2004 | Rhoads et al. |
| 6,785,671 B1 | 8/2004 | Bailey et al. |
| 6,804,376 B2 | 10/2004 | Rhoads et al. |
| 6,850,626 B2 | 2/2005 | Rhoads et al. |
| 6,944,319 B1 | 9/2005 | Huang et al. |
| 7,032,072 B1 | 4/2006 | Quinn et al. |
| 7,035,855 B1 | 4/2006 | Kilger et al. |
| 7,154,146 B2 | 12/2006 | Savage |
| 7,295,970 B1 | 11/2007 | Gorin et al. |
| 7,324,447 B1 | 1/2008 | Morford |
| 7,376,080 B1 | 5/2008 | Riddle et al. |
| 7,420,992 B1 | 9/2008 | Fang et al. |
| 7,496,661 B1 | 2/2009 | Morford et al. |
| 7,516,111 B2 | 4/2009 | Samson et al. |
| 2001/0010046 A1 | 7/2001 | Muyres et al. |
| 2001/0028662 A1 | 10/2001 | Hunt et al. |
| 2001/0042016 A1 | 11/2001 | Muyres et al. |
| 2001/0056405 A1 | 12/2001 | Muyres et al. |
| 2002/0002488 A1 | 1/2002 | Muyres et al. |
| 2002/0004744 A1 | 1/2002 | Muyres et al. |
| 2002/0059578 A1 | 5/2002 | Nishiura |
| 2002/0116124 A1 | 8/2002 | Garin et al. |
| 2002/0138492 A1 | 9/2002 | Kil |
| 2002/0183076 A1 | 12/2002 | Pande et al. |
| 2003/0009467 A1 | 1/2003 | Perrizo |
| 2003/0105660 A1 | 6/2003 | Walsh et al. |
| 2003/0182249 A1 | 9/2003 | Buczak |
| 2003/0204384 A1 | 10/2003 | Owechko et al. |
| 2003/0208488 A1 | 11/2003 | Perrizo |
| 2005/0065955 A1 | 3/2005 | Babikov et al. |
| 2006/0287969 A1 | 12/2006 | Li |
| 2008/0089591 A1 | 4/2008 | Zhou et al. |
| 2008/0104032 A1 | 5/2008 | Sarkar |

FOREIGN PATENT DOCUMENTS

| | | |
|---|---|---|
| EP | 0642060 A2 | 3/1995 |
| WO | 9927668 | 6/1999 |
| WO | 0111506 | 2/2001 |
| WO | 2005050482 A1 | 6/2005 |

OTHER PUBLICATIONS

Fang et al., "Design of a Wireless Assisted Pedestrian Dead Reckoning System—The NavMote Experience," IEEE Transactions on Instrumentation and Measurement, vol. 54, Issue 6, Dec. 2005, 17 pages.

Chibelushi et al., "Audio-Visual Person Recognition: an Evaluation of Data Fusion Strategies," University of Wales Swansea, United Kingdom, European Conference on Security and Detection, Apr. 28-30 1997, 6 pages.

Zhao et al., "Localization Using Combing Sensors and Dead-Reckoning," New Science Publishers, Inc., Exerpt Web Page from ACM Portal-Computing Literature Search Engine, 2004, 3 pages.

Written Opinion of the International Searching Authority in connection with International Patent Application No. PCT/US04/31965, mailed Jul. 18, 2005, 4 pages.

International Search Report in connection with International Patent Application No. PCT/US04/31965, mailed Jul. 18, 2005, 4 pages.

Written Opinion of the International Preliminary Examining Authority in connection with International Patent Application No. PCT/US04/31965, mailed Feb. 2, 2007, 4 pages.

International Preliminary Report on Patentability in connection with International Patent Application No. PCT/US04/31965, report completed Sep. 25, 2007, 3 pages.

Office Communication for U.S. Appl. No. 11/692,480, mailed May 12, 2008, 12 pages.

Office Communication for U.S. Appl. No. 11/692,480, mailed Aug. 28, 2008, 13 pages.

Notice of Allowance for U.S. Appl. No. 11/692,480, mailed Nov. 20, 2008, 9 pages.

Office Communication for U.S. Appl. No. 12/389,162, mailed Jan. 4, 2010, 7 pages.

Notice of Allowance for U.S. Appl. No. 12/389,162, mailed May 3, 2010, 9 pages.

Integrating support vector machines in a hierarchical output space decomposition framework, Yangchi Chen; Crawford, M.M.; Ghosh, J.; Geoscience and Remote Sensing Symposium, 2004. IGARSS '04. Proceedings. 2004 IEEE International vol. 2 Digital Object Identifier: 10.11 09/IGARSS.2004.1368565 Publication Year: 2004 , pp. 949-952 vol. 2.

Exploring Multiple Trees through DAG Representations, Graham, M.; Kennedy, J.; Visualization and Computer Graphics, IEEE Transactions on vol. 13, Issue: 6 Digital Object Identifier: 10.1109/TVCG.2007.70556 Publication Year: 2007 , pp. 1294-1301.

An iterative growing and pruning algorithm for classification tree design, Gelfand, S.B.; Ravishankar, C.S.; Delp, E.J.; Pattern Analysis and Machine Intelligence, IEEE Transactions on vol. 13 , Issue: 2 Digital Object Identifier: 10.1109/34.67645 Publication Year: 1991 , pp. 163-174.

Comparison of a decision tree and maximum likelihood classifiers: application to SAR image of tropical forest, Simard, M.; Saatchi, S.; DeGrandi, G.; Geoscience and Remote Sensing Symposium, 2000. Proceedings. IGARSS 2000. IEEE 2000 International vol. 5 Digital Object Identifier: 10.11 09/IGARSS.2000.858324 : 2000 , pp. 2129-2139.

| Class | Overall | Node N₅ | Index |
|---|---|---|---|
| Non-users | 40% | 36% | 90 |
| Low | 20% | 26% | 130 |
| Medium | 20% | 23% | 115 |
| High | 20% | 20% | 100 |

| NODE | % POP | NODE VALUES | | | |
| --- | --- | --- | --- | --- | --- |
| | | NON | LOW | MED | HIGH |
| | | 40% | 20% | 20% | 20% |
| $N_0$ | 5% | 120 | 110 | 100 | 90 |
| $N_1$ | 5% | 100 | 145 | 125 | 95 |
| $N_2$ | 5% | 85 | 105 | 155 | 120 |
| $N_3$ | 25% | 130 | 115 | 100 | 90 |
| $N_4$ | 5% | 125 | 110 | 90 | 115 |
| $N_5$ | 10% | 90 | 130 | 115 | 100 |
| $N_6$ | 10% | 80 | 100 | 120 | 160 |
| $N_7$ | 15% | 140 | 125 | 75 | 85 |
| $N_8$ | 15% | 95 | 95 | 135 | 110 |
| $N_9$ | 5% | 105 | 90 | 105 | 140 |

FIG. 5

| CLASS CODES | | | |
| --- | --- | --- | --- |
| 1 | 2 | 3 | 4 |
| 40% | 20% | 20% | 20% |
| $N_7$ | $N_1$ | $N_2$ | $N_6$ |
| | $N_5$ | $N_8$ | |
| | | | $N_9$ |
| $N_3$ | $N_0$ | | $N_4$ |

FIG. 7

DATA CLASSIFICATION METHODS AND APPARATUS FOR USE WITH DATA FUSION

RELATED APPLICATIONS

This patent arises from a continuation of U.S. patent application Ser. No. 12/389,162, now U.S. Pat. No. 7,792,771, filed Feb. 19, 2009, which is a continuation of U.S. patent application Ser. No. 11/692,480, filed Mar. 28, 2007, now U.S. Pat. No. 7,516,111, which is a continuation of PCT International Application Serial No. PCT/US2004/031965, entitled "Data Classification Methods and Apparatus for Use with Data Fusion," filed on Sep. 28, 2004, which are hereby incorporated by reference in their entireties.

FIELD OF THE DISCLOSURE

The present disclosure relates generally to processing database information and, more specifically, to data classification methods and apparatus for use in fusing multiple databases into a single database.

BACKGROUND

Successful planning, development, deployment and marketing of products and services depend heavily on having access to relevant, high quality market research data. Companies have long recognized that improving the manner in which marketing data is collected, processed, and analyzed often results in more effective delivery of the right products and services to consumers and increased revenues. Recently, companies have sought to more effectively target marketing efforts toward specific groups or individuals having certain combinations of demographic characteristics and psychographic profiles. Such highly targeted marketing efforts may provide a company a significant competitive advantage, particularly for highly competitive markets in which increased revenues are obtained primarily as a result of increased market share.

Market researchers have long dealt with the practical tradeoff between the desire to develop database information that enables companies to develop and deploy highly targeted marketing plans and the desire to develop database information that is more versatile in its application or utility. For example, a database developed from a respondent panel or survey that has been narrowly tailored to provide information related to the television viewing behaviors of a particular regional population having a particular demographic profile may be of little, if any, use when attempting to determine the fast food consumption habits of another population having that same demographic profile.

In response to the practical difficulties (e.g., the cost) associated with assembling market research panels or surveys covering multiple types of consumption activities, behaviors, preferences, etc., market researchers have employed database fusion techniques to efficiently merge or fuse database information from multiple research panels or surveys (typically two at a time) into a single database representing a single virtual population group or respondent-level panel. It is well known that the fusion of two datasets or databases into one dataset or database may enable the development of a database that reveals correlations between the consumption activities, preferences, etc. associated with two datasets or databases in a manner that the individual datasets could not. In other words, existing market research databases can be combined or fused in different ways to generate new datasets or databases that reveal respondent behaviors and/or relationships not previously revealed by the independent databases, without having to physically develop and pay for an expensive multi-purpose respondent panel or survey.

Typically, the fusion of databases or datasets involves a statistical analysis to identify a mathematical function that can be used to predict respondent usage patterns. In general, the mathematical function produced as a result of the statistical analysis is used to guide or facilitate the process of matching observations or records in the datasets or databases to be fused. In some cases, known distance function techniques are used to measure the similarities between observations or records. In other cases, the statistical analysis may process usage data using regression modeling techniques to identify those variables that are common to the databases or datasets to be fused and best suited to match observations or records.

To simplify and/or enhance a data fusion process, it is often desirable to group or segment database observations or records, each of which typically corresponds to a particular person, respondent, or household, according to a plurality of classes, or groups representing different types or levels of consumption behavior (e.g., non-consumers, low consumers, medium consumers, high consumers, etc.) By classifying, grouping, or segmenting the data to be fused, a simplified or separate fusion process can be carried out for each segment. The smaller size of the segments (in comparison to the dataset (s) the segments compose) enables the fusion process to be performed more quickly and efficiently. In addition, the data classification, grouping, or segmentation can produce better results that, for example, enable more accurate prediction of consumption behaviors.

While known fusion techniques typically rely on the use of distance functions or regression models to predict consumption behavior, the resulting predictions are not well-suited to classify or group the records or observations within datasets to be fused into discrete classes or groups. For instance, as noted above, it may be desirable to segment, classify, or group the observations or records within the datasets into classes or groups such as non-consumers, high consumers, medium consumers, and low consumers. However, regression models and distance functions are specifically adapted to predict information (e.g., usage or consumption information) that is inherently continuous in nature (e.g., dollars spent) rather than discrete such as, for example, usage classifications or groups.

BRIEF DESCRIPTION OF THE DRAWINGS

FIG. 5 depicts an example set of values that may be generated for a plurality of classification tree nodes using the node analysis process of FIG. 2.

FIG. 7 depicts an example manner in which nodes may be grouped using the example node grouping process of FIG. 6.

DETAILED DESCRIPTION

Figure 1:
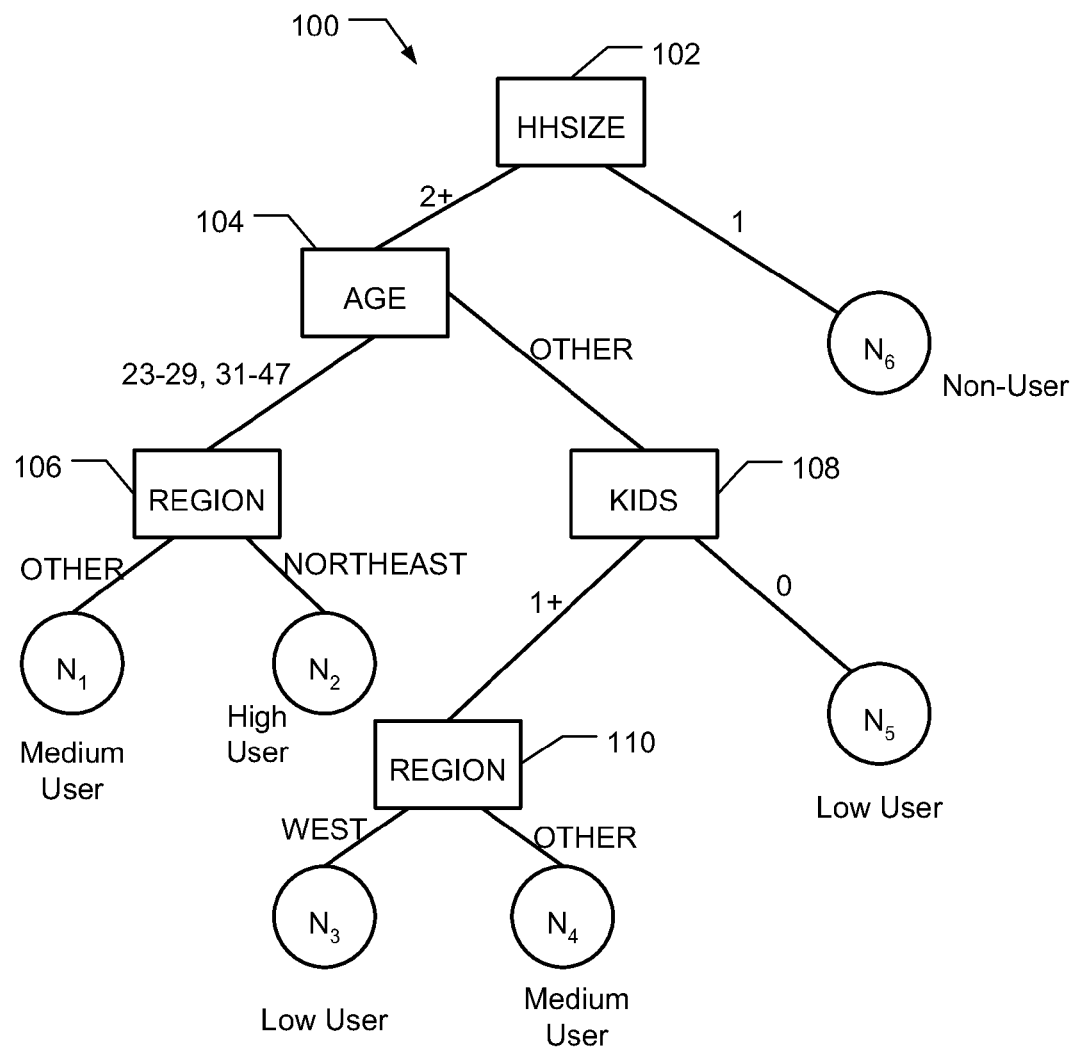
FIG. 1 depicts an example classification tree.

In general, the data classification methods, apparatus, and articles of manufacture described herein may be advantageously applied to enhance or improve the operation and/or results of data fusion processes. Specifically, the methods, apparatus, and articles of manufacture described herein analyze the nodes of a data classification tree to selectively form an arrangement or groups of nodes to represent respective classes, or groups associated with one or more databases or datasets. The groups of nodes are then used to classify each of the records within the database(s) or dataset(s) to be fused and the classified records may then be fused according to the classifications.

Before providing a detailed discussion of the above-outlined data classification methods, apparatus, and articles of manufacture, a general discussion of data classification trees is provided. In general, data classification trees or classification tree models are one well-known manner of classifying, grouping, or otherwise segmenting data. Typically, the classifications, groups, segments, etc. represent discrete usage classes or groups and, thus, typically represent a particular type of consumer behavior. For instance, it may be desirable to classify, group, or segment consumer data records or observations into high, medium, low, and non-consumption groups, or classes. Classifying, grouping, or segmenting consumer data records in this manner may help to provide a more intuitive understanding of the profile of a population, which may facilitate the selection of effective advertising types and time slots, product developments and, more generally, can facilitate targeted marketing efforts toward certain members of the population.

Classification trees or models are typically composed of a set of rules by which data (e.g., records or observations, each of which may correspond to a person, a household, etc.) within one or more datasets or databases can be classified, grouped, segmented, etc. into a plurality of discrete classes, groups, or segments. A set of descriptive variables (e.g., demographic information, psychographic information, etc.) may be logically interrelated in a hierarchical (e.g., tree-like) data structure according to the values of the variables. The lowest hierarchical level of the classification tree terminates in a set of nodes (i.e., terminal nodes), which are commonly referred to as leaves. Each terminal node or leaf is typically associated with or corresponds to one group, class, or segment and more than one of the terminal nodes may correspond to a given group, class, or segment. Each leaf or terminal node may then reflect a particular type of behavior (e.g., consumption behavior) that is known to be consistent with the class, group, or segment associated with the node.

In practice, the terminal nodes of a classification tree are not perfectly predictive but, instead, are probabilistic in nature and, thus, the class or group associated with each of the nodes is a predicted class or group. In this manner, each terminal node or leaf may be thought of as a likelihood, probability, or prediction that a data record or observation processed by the classification tree model or hierarchy is actually a member of the class or group with which it is associated according to the classification tree or model.

Typically, the class, group, or segment (e.g., type of consumption behavior) that occurs most frequently or that is most likely to occur for the data records associated with each terminal node determines the predicted class or group for that terminal node. Thus, when a dataset or plurality of data records are grouped or classified according to the classification tree, each terminal node may be associated with a frequency distribution of all or some of the classes or groups predicted by the tree. In other words, for each terminal node or leaf, there is at least some probability that data actually associated with each of the possible classes or groups will occur (i.e., will be classified or misclassified) at that node. However, the probability with which each of the possible classes occurs at a given node will typically vary from class to class as well as node to node. Again, as noted above, the class or group that is most likely to occur at a given terminal node typically determines the class or group assigned to that node and, thus, determines the classification or grouping of any data that is associated with that node as a result of being processed by the classification tree.

As can be appreciated from the foregoing, because each terminal node is assigned to correspond to only one class or group (i.e., each terminal node is used to predict only one class or group) and because the probabilistic nature of the nodes results in data actually associated with multiple classes being associated with each node, misclassification of data records can occur. For example, a classification tree may process a data record actually associated with a non-consumer and associate that record with a terminal node that is assigned to predict high volume consumers (e.g., classify a respondent that is actually a non-consumer as a high consumer). Thus, each terminal node typically has an associated error rate (i.e., a likelihood of misprediction or misclassification) that can be quantified and which is typically acceptable in view of the likelihood or probability that data records associated with that node by the classification tree are classified or grouped correctly.

In one example, the above-outlined data classification methods, apparatus, and articles of manufacture identify classification tree information such as, for example, the variables, the hierarchical relationships between the variables, the terminal nodes or nodes, the classes or groups to which the nodes originally correspond, etc. The classes or groups may correspond to usage or consumption classes or any other behavioral characteristic associated with a population of individuals, households, etc. However, as described in greater detail below, the classes or groups to which the nodes originally correspond may be changed or modified based on an analysis of the ability of the nodes to effectively predict the actual class or group to which data records belong. The classification tree information may be stored in a suitable data structure and/or retrieved from a volatile and/or non-volatile memory.

Analysis of the nodes of the classification tree begins by assigning each of the nodes a plurality of values, where each of the plurality of values is indicative of a relationship between that node and only one of the classes or groups associated with the nodes. The plurality of values associated with each of the nodes may be representative of a frequency distribution of the classes at that node (e.g., the frequency of occurrence, probability of occurrence, etc. for each of the classes at that node). In particular, each of the plurality of values may be an index value or ratio associated with the likelihood that a data record actually associated with a particular one of the classes or groups will be associated with the node corresponding to the value and, thus, predicted or classified (correctly or incorrectly) to have behavior(s) similar or identical to those associated with the class or group assigned to the node. The index values or ratios may be determined based on a comparison (e.g., a division) of the frequency of occurrence of a particular class at a node and the frequency of occurrence of the particular class within the population as a whole.

Continuing with the example, the node values may then be compared and each node may be assigned to one of the classes or groups based on the comparison. In particular, a class or group code may be assigned or otherwise associated with each node, where each class or group code corresponds to only one of the possible classes or groups associated with the nodes of the classification tree. Thus, each of the nodes is assigned to only one of the classes or groups and, in some cases, at least two of the nodes have the same class or group code. As a result, each of the nodes may become associated with a modified predicted class or group relative to the class or group originally associated with that node prior to the analysis of the classification tree nodes.

In general, the nodes may be assigned to the classes or groups using an iterative process (e.g., a process that may make multiple passes through the node value information) in which relatively larger node values preferably determine the class or group to which each of the nodes is assigned. In some cases, a previously assigned node may be re-assigned to another class or group for which that node has a larger or otherwise better value.

After the nodes have been assigned to the classes or groups, the data records or observations from one or more datasets or databases may be classified based on the assignment of the nodes to the classes or groups. More specifically, each data record or observation from the dataset or database may be analyzed using the classification tree to determine a terminal node that corresponds to the data record or observation. In other words, each data record or observation is analyzed using the classification tree and becomes associated with a particular one of the terminal nodes of the classification tree. The classes or groups to which the terminal nodes have been assigned as a result of the foregoing analysis are then associated with (e.g., by adding class or group identifying information to) the corresponding data records or observation to classify those data records or observations.

Following the classification of the data records or observations according to the classification tree and the modified predicted classes as set forth above, the classified data records or observations may be fused using fusion methods and apparatus such as, for example, the methods and apparatus disclosed in co-pending international patent application number PCT/US03/33392, the disclosure of which is hereby incorporated in its entirety.

Now turning to FIG. 1, an example classification tree 100 is depicted in diagrammatic form. The example classification tree 100 includes a plurality of variables 102, 104, 106, 108, and 110, which may be related to demographic, psychographic, and/or other characteristics of a population of individuals, households, etc. The example classification tree 100 also includes a plurality of terminal nodes $N_1$, $N_2$, $N_3$, $N_4$, $N_5$, and $N_6$, each of which is associated with a particular class, or group of the population. In turn, each class, or group corresponds to a particular type of behavior such as, for example, a consumption or usage behavior. For example, the nodes $N_1$ and $N_4$ may correspond to a medium usage or consumption level, the node $N_2$ may correspond to a high usage or consumption level, the nodes $N_3$ and $N_5$ may correspond to a low usage or consumption level, and the node $N_6$ may correspond to non-users or non-consumers.

In the example classification tree 100 of FIG. 1, the variable 102 corresponds to the respondent's household size, the variable 104 corresponds to respondent age, the variable 106 corresponds to the geographic region in which the respondent's household is located, the variable 108 corresponds to the number of children in the respondent's household, and the variable 110 also corresponds to the geographic region in which the respondent's household is located. Each of the data records or observations (i.e., respondent records or observations) within a dataset or database to be analyzed using the example classification tree 100 contains values corresponding to the variables 102, 104, 106, 108, and 110.

A known method of using the example classification tree 100 to classify a respondent or other data record begins by retrieving the record from a dataset or database. Then, a value representative of household size is extracted from the record. If the extracted value representative of the household size is equal to one, then the record is associated with the terminal node $N_6$, which corresponds to non-users, and the record (and, thus, the respondent associated with the record) is classified as a non-user.

On the other hand, if the household size is greater than or equal to two, then a value representative of the age of the respondent associated with the record is extracted from the record. If the age of the respondent is 23-29 or 31-47, then a value representative of the geographic region in which the respondent's household is located is extracted from the record. If the geographic region is the northeast, then the record is associated with the terminal node $N_2$, which corresponds to high users, and the record (and, thus, the respondent associated with the record) is classified as a high user (i.e., a high consumption user). On the other hand, if the geographic region is not the northeast, then the record is associated with the terminal node $N_1$, which corresponds to medium users, and the record (and, thus, the respondent associated with the record) is classified as a medium user.

If the age of the respondent is not 23-29 or 31-47, then a value representative of the number of children in the respondent's household is extracted from the record. If there are no children in the respondent's household, then the record is associated with the terminal node $N_5$, which corresponds to low users, and the respondent record (and, thus, the respondent associated with the record) is classified as a low user.

On the other hand, if there are one or more children in the respondent's household, then the value representative of the geographic region in which the respondent's household is located is extracted from the record. If the respondent's household is located in the west, then the respondent is associated with the terminal node $N_3$, which corresponds to low users, and the record (and, thus, the respondent associated with the record) is classified as a low user. If the respondent's household is not located in the west, then the respondent record is associated with the terminal node $N_4$, which corresponds to medium users, and the record (and, thus, the respondent associated with the record) is classified as a medium user.

Thus, the above-described known manner of using a classification tree to classify data records analyzes the values associated with certain variables within each data record to determine which terminal node and, thus, which usage class, should be associated with that data record. Of course, as noted above, each of the terminal nodes (e.g., the nodes $N_1$, $N_2$, $N_3$, $N_4$, $N_5$, and $N_6$) is probabilistic in nature and, thus, predictive of the actual classification of the data record. As a result, the example classification tree 100 and known analysis method described above may properly classify some records, while other records are misclassified. However, typically, the degree to which a classification tree misclassifies can be quantified and such a tree may be refined to reduce the probability of misclassification to an acceptable level.

Figure 2:
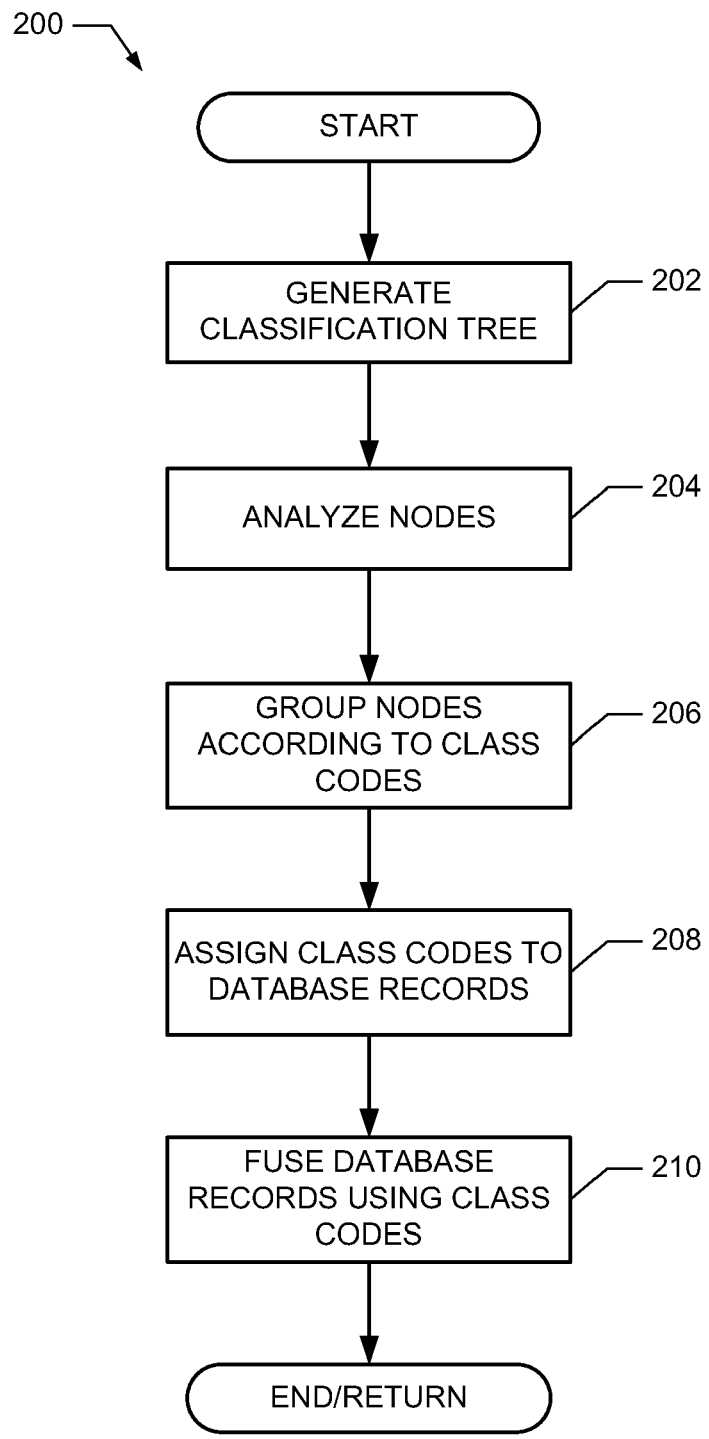
FIG. 2 depicts an example method of classifying or grouping data for use in a data fusion process.

FIG. 2 depicts an example method 200 of classifying or grouping data for use in a data fusion process. Before discussing the example method 200 in detail, it should be recognized that the operations or blocks shown in FIG. 2 may be implemented as machine readable or accessible instructions that can be executed via a processor system such as the example processor system 902 depicted in FIG. 9. Additionally or alternatively, some of all of the operations or blocks shown in FIG. 2 may be implemented using hardware, firmware, software, or any combination thereof. Still further, the order of the blocks or operations shown in FIG. 2 may be changed and/or one or more of the operations or blocks may be eliminated, if desired.

Now turning in detail to the example method 200 of FIG. 2, a classification tree model is generated (block 202) for the purpose of analyzing one or more datasets or databases to classify the records or observations therein. For example, a classification tree similar or identical to the example classification tree 100 shown in FIG. 1 may be generated and stored in a suitable data structure in a memory or other machine accessible medium. Of course, the variables and hierarchical relationships between the variables that compose such a classification tree are carefully selected to accurately predict into which of a plurality of predetermined classes or groups the data records or observations of a dataset or database can be categorized, segmented, etc. In any event, the classification tree may be generated at block 202 using any known technique. Thus, further details relating to the manner in which such a classification tree may be generated are not provided herein.

The example method 200 then analyzes the terminal nodes of the classification tree (block 204). In general, the node analysis process 204 may generate or assign a plurality of values to each of the nodes (e.g., the nodes $N_1, N_2, N_3, N_4, N_5,$ and $N_6$ of the example classification tree 100 of FIG. 1), where each of the plurality of values assigned to a given node corresponds to only one class, or group associated with the population of records or observations to be analyzed. Additionally, as described in greater detail below in connection with FIGS. 3 and 4, each of the values for a given node may be an index value that represents a relationship (e.g., a ratio) between the probability that (or the frequency with which) a particular group or class occurs at the given node and the probability or frequency of occurrence of the particular group or class within the overall population. In this manner, the values (e.g., index values) calculated for each node represent how the distribution of classes at that node differs from the distribution of classes in the overall population.

In addition to generating a value corresponding to each of the possible classes, or groups for each node, the node analysis process 204 generates a value representative of the proportion of an overall population that will be associated with each of the nodes. For example, as described in greater detail in connection with FIG. 5 below, a value representative a of sum-of-weights or population projection for each node can be generated for each node. The values representative of the proportion of the overall population that is associated with the nodes may be used to determine a relative size or importance of each of the nodes.

After performance of the node analysis process (block 204), the nodes are grouped or arranged using the node values generated at block 204 according to class or group codes, where each class or group code corresponds to only one class, or group (e.g., a usage or consumption class) (block 206). As described in greater detail in connection with FIGS. 6 and 7 below, the grouping or arrangement of nodes may be an iterative process in which nodes are assigned, grouped, or arranged so that nodes best able to predict a particular class or group are associated with a class or group code corresponding to that particular class or group. Further, the grouping or arrangement of nodes is performed so that the sum-of-weights of (or sum of probabilities associated with) the nodes assigned to each of the class or group codes, each of which corresponds to only one of the classes or groups, is similar or substantially equal to the probability of occurrence of the class or group associated with the class or group code within the overall population. Following the grouping or arrangement process (block 206), the class or group code to which a given node is assigned may be the same or different from the class or group originally corresponding to the node.

In contrast to the node grouping or arrangement process (block 206) described herein, known classification tree methods typically classify a node as the class that most frequently occurs at that node, regardless of the characteristics of the overall population, regardless of the relative importance or size of the node in comparison to the overall population and other nodes, and regardless of the overall effectiveness of the classification tree at accurately predicting or classifying data records or observations.

After performance of the node grouping or arrangement process (block 206), the node grouping or arrangement (e.g., the example node grouping of FIG. 7) may be used to assign class codes to data records or observations to thereby classify the data records or observations (block 208). In general, each data record may be processed using a classification tree (e.g., similar to the manner in which the example classification tree 100 may be used to analyze or process data records as described above) to determine which terminal node should be associated with the data record. Then, a node grouping or arrangement (e.g., similar to the example node grouping or arrangement depicted in FIG. 7) may be used to assign a class or group code (and, thus, a modified predicted class or group) to that node. If desired, the assigned class or group code may be inserted in the data record or otherwise associated with the data record.

Finally, the data records, including their assigned class codes, may be fused using the class codes to guide or otherwise facilitate the fusion process (block 210). For example, in the case of a fold-over fusion (i.e., where an original dataset or database is split into two datasets or databases), the assigned class codes may be inserted as matching variables. Additionally or alternatively, the assigned class or group codes may be used to segment one or more datasets or databases to enhance the overall performance of a fusion process on the one or more datasets or databases.

Figures 3, 4:
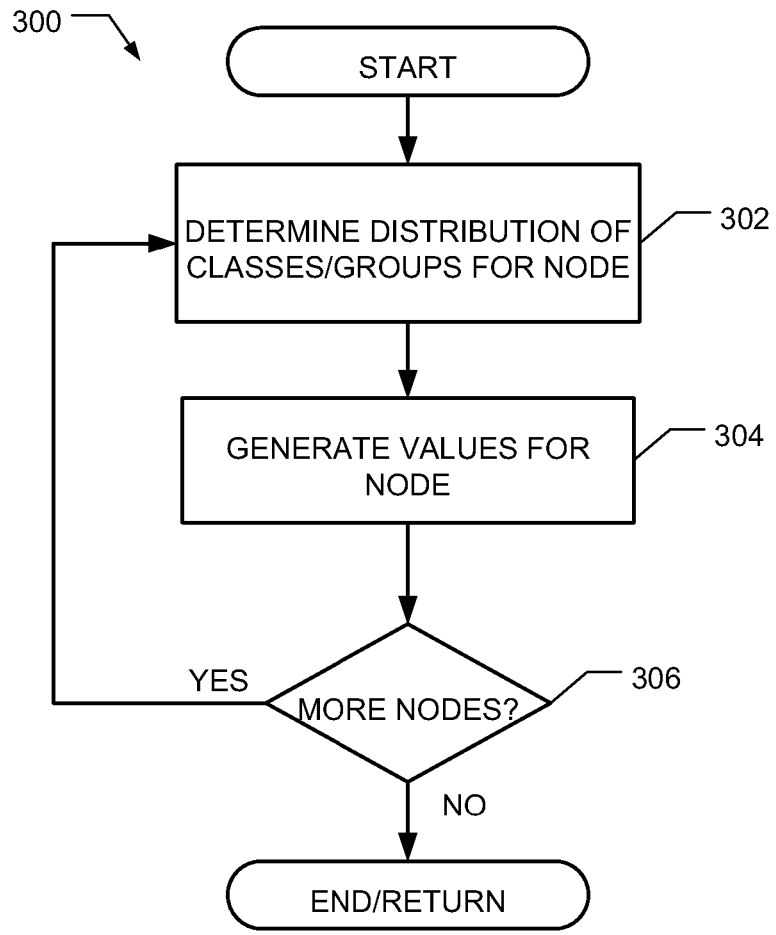
FIG. 3 depicts an example method of generating node values for use in implementing the example node analysis process of FIG. 2.
FIG. 4 depicts in greater detail the manner in which a plurality of values may be generated for a given node based on relationships between the probability of occurrence of each class or group at the node and the probability of the occurrence of the classes within the overall population.

FIG. 3 depicts an example method 300 of generating node values for use in implementing the example node analysis process (block 204) of FIG. 2. Initially, the example method 300 determines a distribution of classes or groups for a selected node (block 302). For example, a frequency distribution, probability distribution, etc. of classes or groups at the selected node may be used. A plurality of values may then be generated for the selected node (block 304). For example, the values may be generated to reflect a relationship between the frequency or probability distribution values associated with the classes or groups at the selected node and the distribution of classes or groups within an overall population.

In any event, after the values are generated for the selected node (block 304), the example method 300 determines if there are more nodes to process (block 306). If there are more nodes for which values need to be generated, then control returns to the block 302. On the other hand, if there are no more nodes to process, then the example method 300 ends or returns control to, for example, the example method 200 of FIG. 2.

FIG. 4 depicts in greater detail the manner in which a plurality of values may be generated for a given node based on relationships between the probability of occurrence of each class or group at the node and the probability of the occurrence of the classes within the overall population. As shown in the example of FIG. 4, each class (i.e., non-users, low, etc.) is associated a probability or frequency of occurrence within the overall population. For example, non-users account for 40% of the overall population. In addition, each of the four possible classes or groups has an associated probability or frequency of occurrence at the node $N_5$. For example, there is a 36% probability that a non-user will occur at the node $N_5$. The values in the column labeled $N_5$ in FIG. 4 may be determined at, for example, block 302 of the example method 300 of FIG. 3. The index values for the node $N_5$ are generated for each of the classes (e.g., at block 304 of FIG. 3) by dividing the probability of occurrence of a class at the node (e.g., the node $N_5$) by the probability of occurrence of the class in the overall population. For example, the index value for non-users (i.e., 90) is generated by dividing 36% by 40%. It should be recognized that with known classification tree methods, the node $N_5$ would have simply been classified as a non-user node because the most frequently occurring class at the node $N_5$ is non-users (i.e., non-users occur 36% of the time). However, as described in greater detail in connection with FIG. 6 below, the index values may be used to change the classification of a node to better predict the actual class or group of a data records. For example, as depicted in FIG. 4, the largest index value for the node $N_5$ occurs for the class "low," which suggests that the node $N_5$ could be better used to predict low users rather than non-users.

FIG. 5 depicts an example set of values or analysis results that may be generated for a plurality of classification tree nodes using the node analysis process (block 204) of FIG. 2. As shown in the example of FIG. 5, each of the nodes $N_0$ through $N_9$ has a plurality of index values associated therewith that may be generated as described above in connection with FIGS. 3 and 4. In addition, each of the nodes in the example of FIG. 5 is also associated with a value representative of its importance relative to the overall population. For example, about 5% of the data records are associated with the node $N_0$, whereas about 25% of the data records are associated with the node $N_3$. Also, the probability of occurrence of each of the four classes or groups within the overall population is included in the example analysis results of FIG. 5. The information depicted in the example of FIG. 5 may, for example, be stored in a memory using any desired data structure such as, for example, one or more tables, linked lists, arrays, etc. Further, while the example of FIG. 5 depicts index values as being used as the plurality of values representative of each of the nodes, other values could be used instead. For example, other values representative of a relationship between the occurrence of a particular class or classes or groups at each of the nodes and the characteristics of the population could be used instead.

Figure 6:
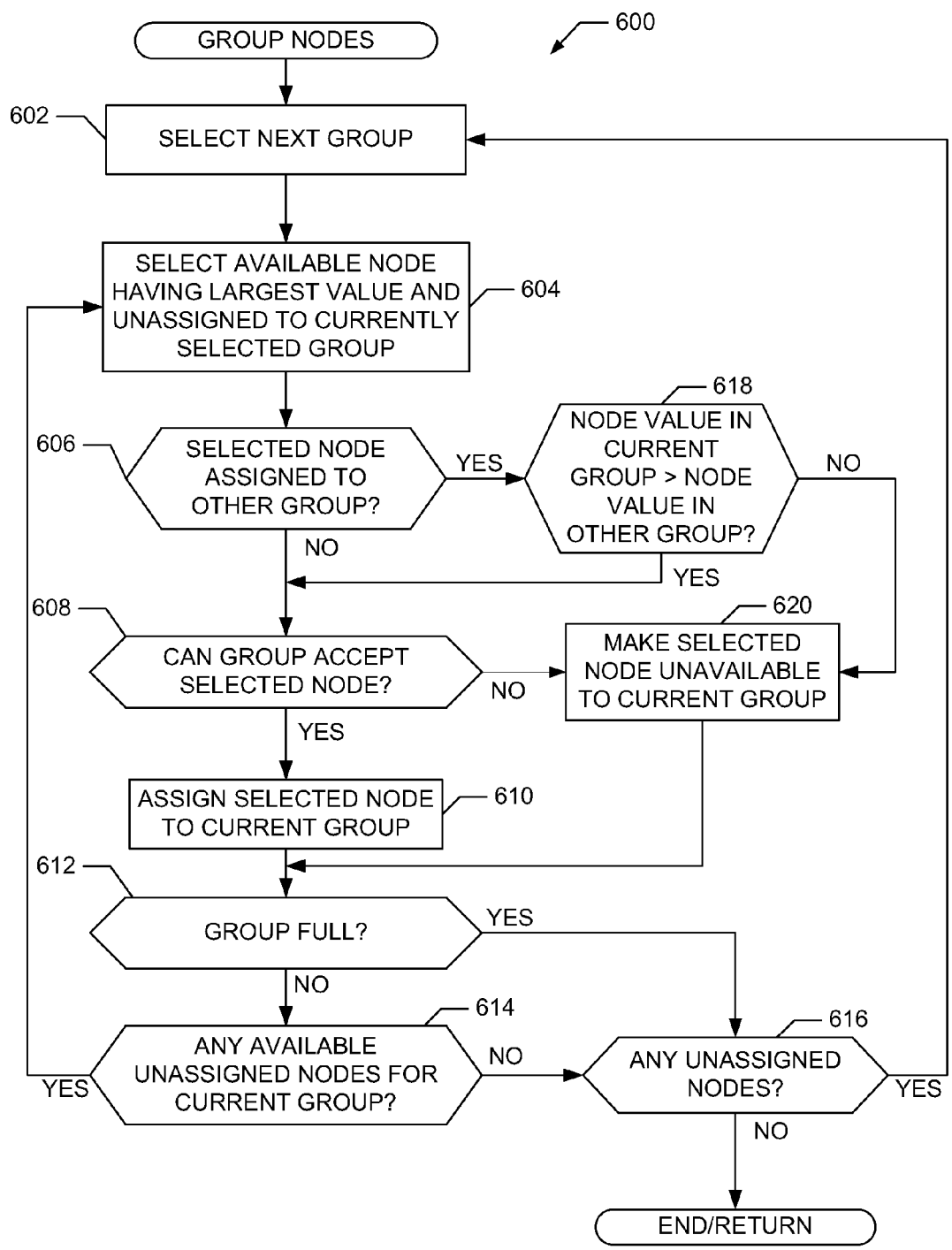
FIG. 6 depicts an example manner of implementing the node grouping process of FIG. 2.

FIG. 6 depicts an example manner of implementing the node grouping process (block 206) of FIG. 2. The example method 600 depicted in FIG. 6 is described below by way of example in connection with the example set of node values or analysis results of FIG. 5 and the example node grouping depicted in FIG. 7. In general, the example method 600 may be used to iteratively examine the example node analysis results shown in FIG. 5 to assign class or group codes to the nodes as shown in example of FIG. 7.

Now turning in detail to FIG. 6, the example method 600 selects a group or class to examine or process (block 602). More specifically, the example method 600 selects one of the four classes or groups (i.e., columns) of example node analysis results of FIG. 5. While the example method 600 could select any of the groups or classes (i.e., columns) in any order or sequence, the example described below first selects the high consumption or usage class followed by medium, low, and then non-users (i.e., moves sequentially from right to left across the example node analysis results of FIG. 5 one or more times). Moving from right to left across the example data of FIG. 5 (i.e., beginning the grouping process by starting with the rightmost column) will tend to result in a final grouping or arrangement of nodes (e.g., the example node grouping of FIG. 7) that more accurately identifies those data records that should be classified in the high consumption or usage class or group. In this manner, marketing efforts may, for example, be better targeted toward a particular class or group (e.g., the high consumption class or group).

While the example method 600 is described as moving from right to left across the columns of class or group data depicted in FIG. 5, the example method 600 could select groups or portions of data at block 602 in different manners. For example, the example method 600 could move from left to right beginning with the non-user class or group, the class or group data could be selected according to a predetermined order or sequence (e.g., medium, then low, then non, followed by high), the class or group data could be selected in a random fashion, the class or group data could be selected in a varying sequence depending on the progress of the grouping process, etc.

In any event, in this example, the high usage class or group is first selected at block 602 and the example method 600 then selects an available node (initially all nodes are available) that is unassigned to the current group or class (i.e., the high usage class) and which has the largest value (e.g., index value) (block 604). Thus, in this example, the node $N_6$ is selected at block 604 because it is available, unassigned to the high usage class, and has the highest index value (i.e., 160). Then, the example method 600 determines if the selected node (i.e., $N_6$) is assigned to another group (i.e., one of the groups 1, 2, 3, or 4 shown in FIG. 7) (block 606). In this case, the node $N_6$ is not assigned to another group or class and the example method 600 determines if the group associated with high usage class (i.e., the group or class having the class code 4 shown in FIG. 7) can accept the node $N_6$ (block 608).

The method 600 determines if a group can accept a selected node (block 608) by comparing the total sum-of-weights assigned to the group (including the currently selected node) to the total weight the group or class has within the overall population. For example, continuing with the example, the currently selected node $N_6$ contributes a weight of 10% of the total population, there are no other nodes currently assigned the high usage group (i.e., group 4) so the total sum-of-weights would be 10% if the node $N_6$ were added to the group 4, and the total weight of group 4 (i.e., the high usage class) is 20% of the total population. Accordingly, the example method 600 determines at block 608 that group 4, which corresponds to the high usage class or group, can accept the node $N_6$ and assigns the node $N_6$ to group 4 (block 610).

After assigning the node $N_6$ to group 4, the example method 600 determines if group 4 is full (block 612). A group is full if the total weight of the nodes (i.e., the sum-of-weights) currently assigned to the group is equal to or exceeds the total weight of the class or group within the overall population. In the case of group 4, group 4 is full if the sum of weights assigned to group 4 equals or exceeds 20%. Continuing with the example, after the node $N_6$ is assigned to group 4 at block 610, the example method 600 determines at block 612 that group 4 is not full and then determines if there are any remaining available nodes (in the high usage column of the data of FIG. 5) that are not yet assigned to group 4 (block 614). Only the node $N_6$ has been assigned to group 4 and, as a result, the method 600 determines at block 614 that there are available, unassigned nodes and returns control to block 604.

The example method 600 then continues in the above-described manner to next assign the node $N_9$ (which has an index value of 140 and a weight of 5%) and the node $N_2$ (which has an index value of 120 and a weight of 5%) to group 4. After the node $N_2$ is assigned to group 4, the method 600 determines at block 612 that group 4 is full because the sum-of-weights assigned to group 4 equals 20%, which is the proportion of the overall population that should fall within the high usage class or group. After determining that group 4 is full at block 612, the method 600 determines if there are any currently unassigned nodes (i.e., nodes which have not been assigned to any group or class) (block 616). At this point, the nodes $N_1$, $N_3$, $N_4$, $N_5$, $N_7$, and $N_8$ have not yet been assigned and, thus, the method 600 returns control to block 602 to select the next group.

In this example, after first processing the data in the high usage column of the data of FIG. 5 to form group 4, the method 600 next selects (block 602) the data in the medium usage class or column of the data in FIG. 5 to begin forming group 3 shown in FIG. 7. However, at block 604, the method 600 selects the node $N_2$, which has already been assigned to group 4, for assignment to group 3 (block 604). Then, at block 606 the method 600 determines that the node $N_2$ has already been assigned to group 4 and determines if the node value (i.e., its index value) in the current group or class (i.e., group 3 or the medium usage class or group) is greater than the node value in the group to which the node is currently assigned (i.e., group 4 or the high usage class or group) (block 618). In this case, the index value of the node $N_2$ is 155 in group 3 (i.e., the medium usage class or group) and 120 in group 4 or the high usage class or group. Thus, because the index value 155 is greater than 120 at block 618, the method 600 passes control to block 608. The method 600 then determines that group 3 can accept the node $N_2$ because the sum-of-weights assigned to group 3, including the node $N_2$ does not exceed the total permissible weight of group 3 (i.e., 20%) within the overall population. The method 600 then assigns the node $N_2$ to group 3 (and, thus, de-assigns the node $N_2$ from group 4) at block 610, determines that group 3 is not full at block 612, determines that there are available, unassigned nodes for potential assignment to group 3 at block 614, and returns control to block 604.

The method 600 then continues and assigns the node Ng to group 3, which results in group 3 being full at block 612 and selection of group 2 for processing when the method returns control to block 602. The method 600 continues processing for node assignments to group 2 in the above-described manner so that the nodes $N_1$, $N_5$, and $N_0$ are assigned to group 2. The nodes $N_3$ and $N_7$ are not assigned to group 2 because the sum-of-weights resulting from the assignment of either of these nodes to group 2 as determined at block 608 would exceed the permissible total of 20%, which is the total weight of the low usage group or class within the overall population. Thus, the method determines at block 608 that group 2 cannot accept either of the nodes $N_3$ and $N_7$ and makes those nodes unavailable to group 2 at block 620.

In addition, the method 600 may employ a tie-breaking scheme in the event that multiple nodes having the same value associated with the current usage class or group. For example, when assigning nodes to group 2, the method 600 may recognize that either of the nodes $N_0$ or $N_4$ (both of which have an index value of 110) could be assigned to group 2. In response, the method 600 may simply select the lower of the node numbers, may select the node having a lowest value in comparison to the other nodes within a group or class in which none of the tied nodes have been assigned, or may employ any other tie-breaking scheme.

After assigning the nodes $N_3$ and $N_7$ to group 1, the method 600 determines at block 616 that the node $N_4$ has not been assigned and the method returns control to block 602, which again selects group 4 for processing (i.e. the method 600 begins to iterate through the groups again). During the second pass of the method 600 through the groups, the method 600 attempts to again first select the node $N_2$ for assignment to group 4 because it is indicated as available to group 4 and has the largest value among the nodes that are not currently assigned to group 4. However during this pass, the method 600 determines that the node $N_2$ is assigned to group 3 (block 606) and that the value of the node $N_2$ in group 4 (i.e., 120) is not greater than the value of the node $N_2$ in group 3 (i.e., 155). As a result, the method passes control to block 620 and makes the node $N_2$ unavailable to group 4. The method 600 then continues and assigns the node $N_4$ to group 4. After the method determines at block 616 that all the nodes have been assigned, the method 600 ends or returns control to, for example, the example method of FIG. 2. In the above-described example, the final assignments of the nodes to the groups 1, 2, 3, and 4 are shown in FIG. 7.

Figure 8:
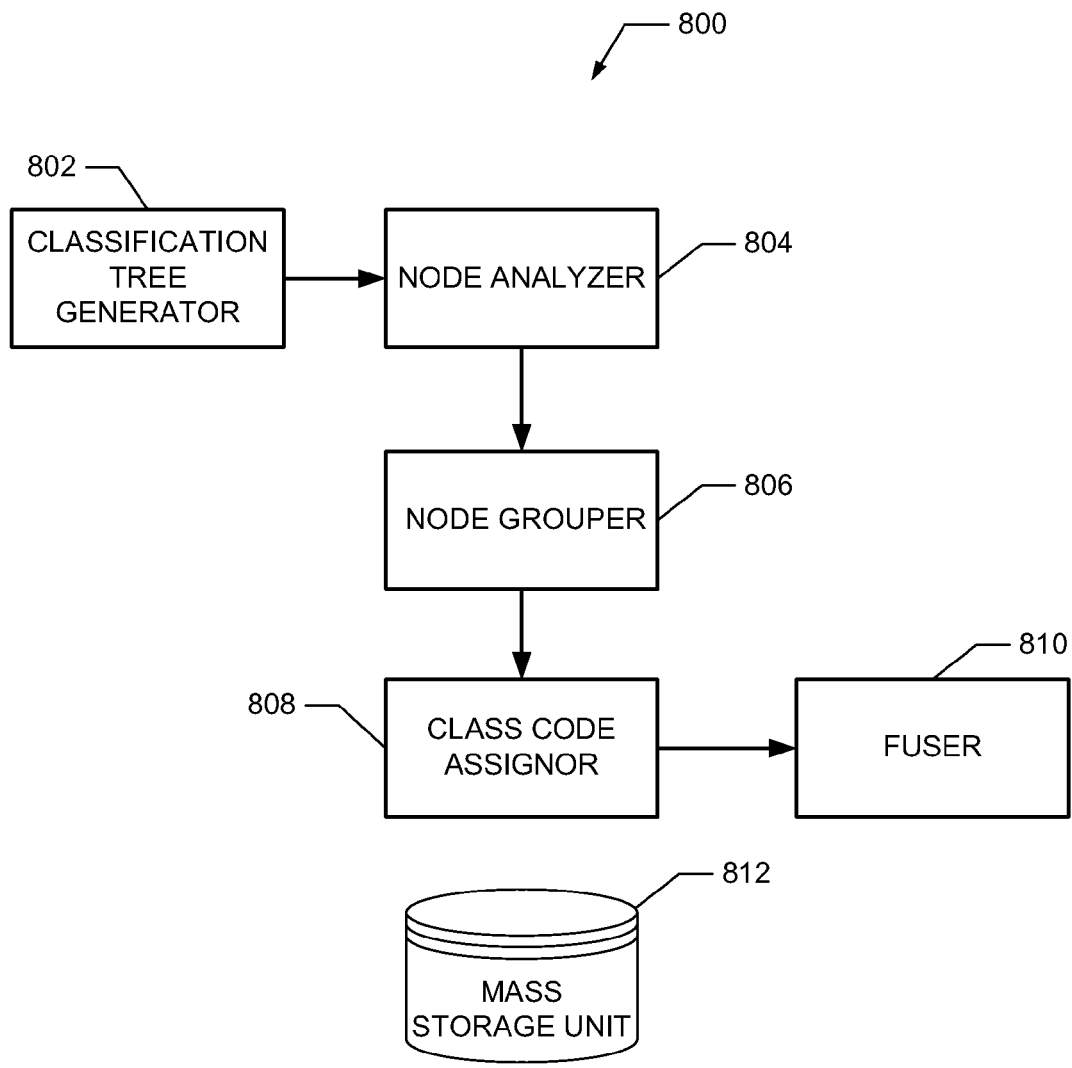
FIG. 8 depicts an example apparatus that may be used to classify and fuse data.

FIG. 8 depicts an example apparatus 800 that may be used to classify and fuse data. As depicted in FIG. 8, the example apparatus 800 includes a classification tree generator 802, a node analyzer 804, a node grouper 806, a class code assignor 808, a fuser 810, and a mass storage unit 812, all of which are coupled as shown. More specifically, the classification tree generator 802 may be configured to perform the operations of block 202 of FIG. 2 to generate a classification tree such as, for example, the example classification tree 100 of FIG. 1. The node analyzer 804 may be configured to perform the node analysis operations of block 204 of FIG. 2 and the operations shown in FIG. 3 to generate the example node analysis results of FIG. 5. The node grouper 806 may be configured to perform the operations of block 206 of FIG. 2 and the operations of FIG. 6 to generate the example node grouping depicted in FIG. 7. The class code assignor 808 and the fuser 810 may be configured to perform the operations of blocks 208 and 210, respectively, of FIG. 2. The mass storage unit 812 may be configured to store classification tree data such as that depicted in FIG. 1, as well as node analysis results such as those shown in FIG. 5 and node grouping results such as those shown in FIG. 7. The mass storage unit 812 may be implemented using any desired machine accessible medium including solid state volatile and/or non-volatile memory, optical media, magnetic media, etc.

Also, it should be recognized that any or all of the structure shown in the example system 800 of FIG. 8 may be implemented using primarily software, firmware or instructions stored on a machine accessible medium and executed by a processor and/or may be implemented using primarily hardware, including one or more application specific integrated circuits, discrete semiconductor devices, passive components, logic circuitry, analog circuitry, etc. Alternatively, any desired combination of hardware, software and/or firmware may be used.

The methods described herein (e.g., the example methods depicted in FIGS. 2, 3 and 6) may be implemented using instructions or code stored on a machine readable or accessible medium that, when executed, cause a machine to perform all or part of the methods. For example, the instructions or code may be a program for execution within by a processor, such as the processor 900 within the example processor-based system 902 depicted in FIG. 9. The program may be embodied in software stored on a tangible medium such as a CD-ROM, a floppy disk, a disk drive, a digital versatile disk (DVD), or a memory associated with the processor 900, but persons of ordinary skill in the art will readily appreciate that the entire program and/or parts thereof could alternatively be executed by a device other than the processor 900 and/or embodied in firmware or dedicated hardware in a well-known manner. For example, any or all of the blocks shown in FIGS. 2, 3, and 6 could be implemented by software, hardware, and/or firmware. Further, although the example methods are described with reference to the flow diagrams illustrated in FIGS. 2, 3 and 6, persons of ordinary skill in the art will readily appreciate that many other methods of implementing the methods described herein may alternatively be used. For example, the order of execution of the blocks may be changed, and/or some of the blocks described may be changed, eliminated, or combined.

Figure 9:
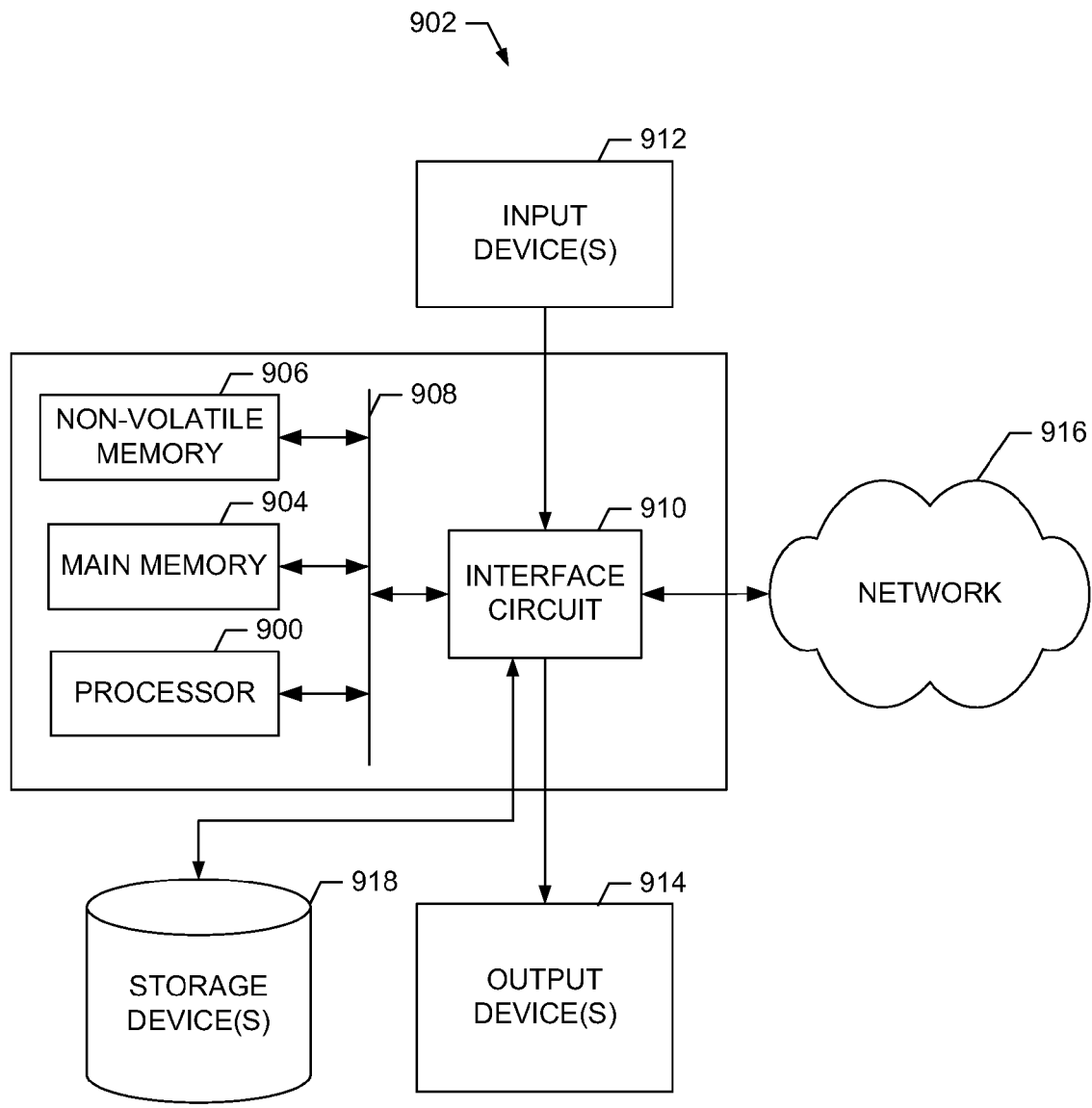
FIG. 9 is example processor-based system that may be used to implement the methods and apparatus described herein.

Now turning in detail to FIG. 9, the example processor-based system 902 may be, for example, a server, a personal computer, a personal digital assistant (PDA), an Internet appliance, a DVD player, a CD player, a digital video recorder, a personal video recorder, a set top box, or any other type of computing device.

The processor 900 may, for example, be implemented using one or more Intel® microprocessors from the Pentium® family, the Itanium® family or the XScale® family. Of course, other processors from other families are also appropriate.

The processor 900 is in communication with a main memory including a volatile memory 904 and a non-volatile memory 906 via a bus 908. The volatile memory 904 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 906 may be implemented by flash memory and/or any other desired type of memory device. Access to the memory 904 is typically controlled by a memory controller (not shown) in a conventional manner.

The system 902 also includes a conventional interface circuit 910. The interface circuit 910 may be implemented by any type of well-known interface standard, such as an Ethernet interface, a universal serial bus (USB), and/or a third generation input/output (3GIO) interface.

One or more input devices 912 are connected to the interface circuit 910. The input device(s) 912 permit a user to enter data and commands into the processor 900. The input device(s) can be implemented by, for example, a keyboard, a mouse, a touchscreen, a track-pad, a trackball, isopoint and/or a voice recognition system.

One or more output devices 914 are also connected to the interface circuit 910. The output devices 914 can be implemented, for example, by display devices (e.g., a liquid crystal display, a cathode ray tube display (CRT), a printer and/or speakers). The interface circuit 910, thus, typically includes a graphics driver card.

The interface circuit 910 also includes a communication device such as a modem or network interface card to facilitate exchange of data with external computers via a network 916 (e.g., an Ethernet connection, a digital subscriber line (DSL), a telephone line, coaxial cable, a cellular telephone system, etc.).

The system 902 also includes one or more mass storage devices 918 for storing software and data. Examples of such mass storage devices include floppy disk drives, hard drive disks, compact disk drives and digital versatile disk (DVD) drives.

Although certain methods and apparatus and articles of manufacture have been described herein, the scope of coverage of this patent is not limited thereto. To the contrary, this patent covers all methods, apparatus and articles of manufacture fairly falling within the scope of the appended claims either literally or under the doctrine of equivalents.

What is claimed is:

1. A method, comprising:
   generating a classification tree having a plurality of terminal nodes, each of the terminal nodes having a frequency distribution related to a plurality of classes at the respective terminal node;
   at each terminal node, combining the frequency distribution of the terminal node with an overall population frequency distribution to generate an index value for each of the classes at the terminal node such that each of the index values represents a difference between a corresponding portion of the frequency distribution and a corresponding portion of the overall population frequency distribution;
   modifying the classification tree based on the index values; and
   associating each data record of a first dataset with one of the terminal nodes based on the modified classification tree.

2. A method as defined in claim 1, wherein the first dataset is to be fused with a second dataset based on the associations of the data records with the terminal nodes.

3. A method as defined in claim 1, wherein modifying the classification tree comprises arranging the terminal nodes based on the index values.

4. A method as defined in claim 3, wherein arranging the terminal nodes based on the index values comprises identifying which of the terminal nodes has a greatest index value for a first one of the classes and is unassigned to the first class.

5. A method as defined in claim 4, further comprising, when the identified terminal node has been assigned to a second one of the classes different from the first class, determining whether a first index value of the identified terminal node for the first class is greater than a second index value of the identified terminal node for the second class.

6. A method as defined in claim 5, further comprising making the identified terminal node unavailable to be assigned to the first class when the first index value is less than or equal to the second index value.

7. A method as defined in claim 3, further comprising comparing a sum-of-weights of a weight of the identified terminal node and one or more weights of terminal nodes currently assigned to the first class to a total weight of the first class within an overall population.

8. A method as defined in claim 7, further comprising making the identified terminal node unavailable to be assigned to the first class when the sum-of-weights exceeds the total weight of the first class within the overall population.

9. A tangible machine readable storage medium comprising instructions that, when executed, cause a machine to at least:
   generate a classification tree having a plurality of terminal nodes, the terminal nodes having respective frequency distributions related to a plurality of classes at the respective terminal node;

for each of the terminal nodes, combine the frequency distribution of the respective terminal node with an overall population frequency distribution to generate an index value for respective ones of the classes at the terminal node such that the index values respectively represent a difference between a corresponding portion of the frequency distribution and a corresponding portion of the overall population frequency distribution;

modify the classification tree based on the index values; and associate data records of a first dataset with respective ones of the terminal nodes based on the modified classification tree.

10. A tangible machine readable medium as defined in claim 9, wherein the instructions, when executed, cause the machine to fuse the first dataset with a second dataset using the associations of the data records with the terminal nodes.

11. A tangible machine readable medium as defined in claim 9, wherein the instructions, when executed, cause the machine to modify the classification tree by arranging the terminal nodes based on the index values.

12. A tangible machine readable medium as defined in claim 11, wherein the instructions, when executed, cause the machine to arrange the terminal nodes based on the index values by identifying which of the terminal nodes has a greatest index value for a first one of the classes and is unassigned to the first class.

13. A tangible machine readable medium as defined in claim 12, wherein the instructions, when executed, cause the machine to, when the identified terminal node has been assigned to a second one of the classes different from the first class, determine whether a first index value of the identified terminal node for the first class is greater than a second index value of the identified terminal node for the second class.

14. A tangible machine readable medium as defined in claim 13, wherein the instructions, when executed, cause the machine to make the identified terminal node unavailable to be assigned to the first class when the first index value is less than or equal to the second index value.

15. A tangible machine readable medium as defined in claim 11, wherein the instructions, when executed, cause the machine to compare a sum-of-weights of a weight of the identified terminal node and one or more weights of terminal nodes currently assigned to the first class to a total weight of the first class within an overall population.

16. A tangible machine readable medium as defined in claim 15, wherein the instructions, when executed, cause the machine to make the identified terminal node unavailable to be assigned to the first class when the sum-of-weights exceeds the total weight of the first class within the overall population.

17. An apparatus, comprising:
a tree generator to generate a classification tree having a plurality of terminal nodes, the terminal nodes having respective frequency distributions related to a plurality of classes at the respective terminal node;
a node analyzer to combine the frequency distribution related to the classes at a first one of the terminal nodes with an overall population frequency distribution to generate an index value for each of the classes at the first terminal node such that each of the index values represents a difference between a corresponding portion of the frequency distribution and a corresponding portion of the overall population frequency distribution;
a node grouper to modify the classification tree based on the index values; and
an assignor to associate data records of a first dataset with respective ones of the terminal nodes.

18. An apparatus as defined in claim 17, further comprising a fuser to fuse the first dataset with a second dataset based on the associations of the data records with the terminal nodes.

19. An apparatus as defined in claim 17, wherein the node grouper is to modify the classification tree by arranging the terminal nodes based on the index values.

20. An apparatus as defined in claim 19, wherein the node grouper is to arrange the terminal nodes based on the index values by identifying which of the terminal nodes has a greatest index value for a first one of the classes and is unassigned to the first class.

21. An apparatus as defined in claim 20, wherein the node grouper is to, when the identified terminal node has been assigned to a second one of the classes different from the first class, determine whether a first index value of the identified terminal node for the first class is greater than a second index value of the identified terminal node for the second class.

22. An apparatus as defined in claim 21, wherein the node grouper is to make the identified terminal node unavailable to be assigned to the first class when the first index value is less than or equal to the second index value.

23. An apparatus as defined in claim 19, wherein the node grouper is to compare a sum-of-weights of a weight of the identified terminal node and one or more weights of terminal nodes currently assigned to the first class to a total weight of the first class within an overall population to determine whether the first class can accept the identified terminal node.

24. An apparatus as defined in claim 23, wherein the node grouper is to make the identified terminal node unavailable to be assigned to the first class when the sum-of-weights exceeds the total weight of the first class within the overall population.

* * * * *